(12) United States Patent
Cubbedge

(10) Patent No.: US 7,490,415 B1
(45) Date of Patent: Feb. 17, 2009

(54) EXTENDIBLE TAPE MEASURE FINGER GUARD AND MARKING ASSIST DEVICE

(76) Inventor: Phil Eugene Cubbedge, 1165 State Rd., 206, St. Augustine, FL (US) 32086

( * ) Notice: Subject to any disclaimer, the term of this patent is extended or adjusted under 35 U.S.C. 154(b) by 18 days.

(21) Appl. No.: 11/900,585

(22) Filed: Sep. 13, 2007

(51) Int. Cl.
*G01B 3/10* (2006.01)

(52) U.S. Cl. ........................................ 33/770

(58) Field of Classification Search ............... 33/759, 33/760, 768, 770
See application file for complete search history.

(56) References Cited

U.S. PATENT DOCUMENTS

| | | | |
|---|---|---|---|
| 3,289,305 A * | 12/1966 | Norton | 33/759 |
| 3,324,560 A * | 6/1967 | Snyder | 33/768 |
| 6,510,622 B2 * | 1/2003 | Laughlin et al. | 33/770 |
| 6,763,603 B2 * | 7/2004 | Carrabino | 33/770 |
| 6,804,898 B1 * | 10/2004 | Hsu | 33/770 |
| 6,935,045 B2 * | 8/2005 | Cubbedge | 33/770 |
| 2004/0060188 A1 * | 4/2004 | Cubbedge | 33/770 |

\* cited by examiner

*Primary Examiner*—G. Bradley Bennett

(57) ABSTRACT

An improved device for attachment to a retractable tape measure is provided which functions as a finger guard and a measurement index or indices either temporarily fixed or moveably attached to the tape storage case or measurement tape. At least one measurement index and at least one scoring or marking feature are provided to insure accurate and repeatable measurements directed perpendicularly to the direction of tape extension. An undercut is provided upon an edge of the device to facilitate the slide of the device along the workpiece edge.

3 Claims, 3 Drawing Sheets

EXTENDIBLE TAPE MEASURE FINGER GUARD AND MARKING ASSIST DEVICE

BACKGROUND OF THE INVENTION

This invention is an improvement related to U.S. Pat. No. 6,935,045 which is incorporated into this application by reference. This invention is directed toward the field of measurement, marking and scoring (or cutting) as practiced in professions such as sewing, carpentry, and metalworking. It is very important to achieve rapid, accurate, and repeatable measurements while protecting the hands of the worker. Ease of use is also a very important requirement since time is often limited under actual working conditions.

Experience with the products of U.S. Pat. No. 6,935,045, has led to the improvements claimed by this invention.

BRIEF SUMMARY OF THE INVENTION

In order to provide repeatability, accuracy and safety in the mechanical trades, an improved attachment for an extensible tape measure is provided which comprises guarding for the fingers, at least one measurement index, and at least one marking or scouring device holder. Said improved attachment is physically a box shaped device which may be about one (1.5) inch by one (1.5) inch by six (6) inches with functionally shaped holes and grooves. When in use, the attachment will be temporarily fixed in position on the extended tape, but will have the ability to be easily removed or relocated as required. A measurement index is defined as a line or edge which can be viewed in an easily and repeatable fashion in its position relative to measurement markings on a measurement tape. The attachment will provide at least one marking assistance edge positionaly related to a measurement index and one marking instrument holder or scouring (cutting) instrument holder also positionaly related to a measuring index. The marking and scouring provisions may or may not be identical.

This invention's improvements over the attachment of U.S. Pat. No. 6,935,045 are provision of an undercut along the entire longer lower front edge of the attachment, a roughly centered vertical view slit on its long side whose depth is exactly aligned vertically with the depth and edge of said undercut, and a tape holding slot on its lower surface which holds the tape in a position easily viewable relative to measurement indices. Releasable clamping of the attachment at a fixed position on the measurement tape is provided.

DETAILED DESCRIPTION OF THE INVENTION

Figure 1:
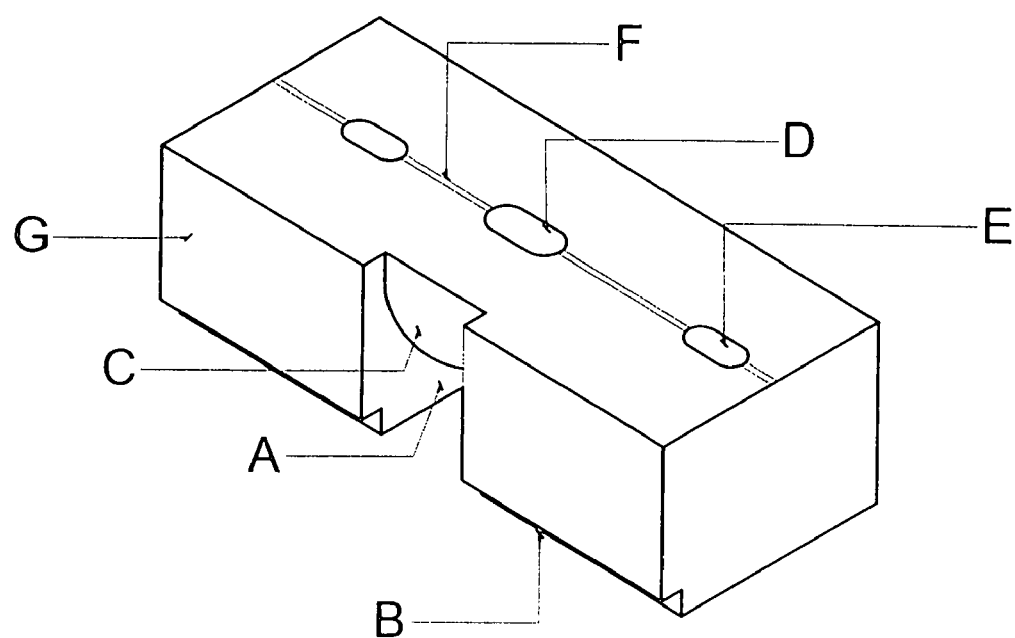
FIG. 1. shows a tape measure finger guard and marking assist device which, for one example, may be one (1.5) inch high, about one (1.5) inch deep, and six (6) inches long. These measurements are in no way defining, but serve as approximate practical values. There is a tape retention slot (A) passing perpendicularly from one of the lower edges of one six (6) by one (1.5) inch side to its opposite side. This slot is shaped to retain a measuring tape near the lower edge of the device with the concave side of the tape facing upwards. Located perpendicularly to slot A on this 6 inch lower edge is an undercut groove (B) about 0.2 inches deep by 0.2 inches high. A vertical view slit (C) whose depth matches the depth of said undercut groove may be provided, the vertical inward edge of which provides a clear view of the attached measuring tape and serves as a measurement index. Additionally or alternatively, a viewport D, allowing tape measurement markings to be read relative to a central measurement index may be provided. A central vertical pencil holder hole (E) may be provided; whose position related to a measurement index (F) is fixed and known. Alternatively, the pencil holder provision may be located with its marking line centered on other measurement indices such as the inner undercut edge of groove (B). Front edge (G) of the device can also serve as a measurement index. The pencil holder hole may be round or oval. Cutting device holding provision may be made via an internal or external groove, with the line of cut fixed relative to a measurement index.
Figure 2:
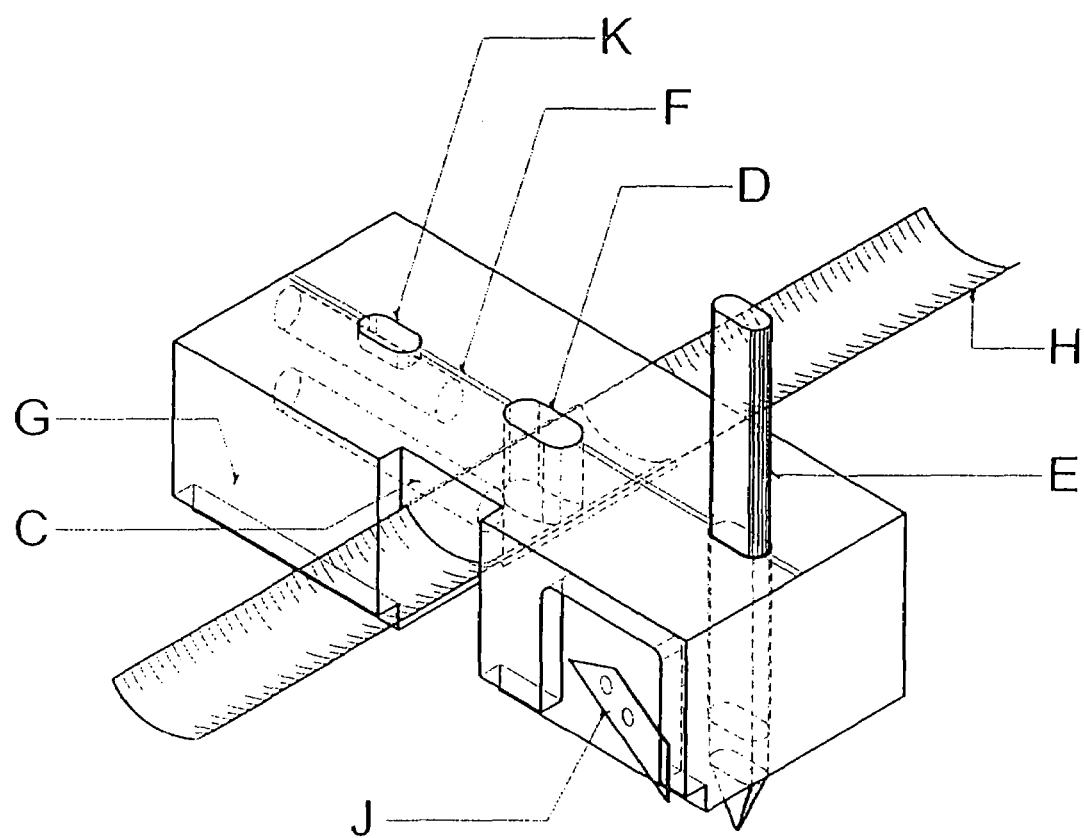
FIG. 2. is a more detailed view of the device ready for use. A tape (H) is mounted into the device and the use of either the device front edge (G), the inward vertical edge of the vertical view slit (C), or the center line (F) through viewport (D) as measurement indices related to cutting or marking is shown. An oval pencil is shown at (E) positionally related to measurement index (F). A scouring blade is shown at (J) with its cutting edge related to measurement index (C). Inclusion of a bubble level float could be provided at (K).
Figure 3:
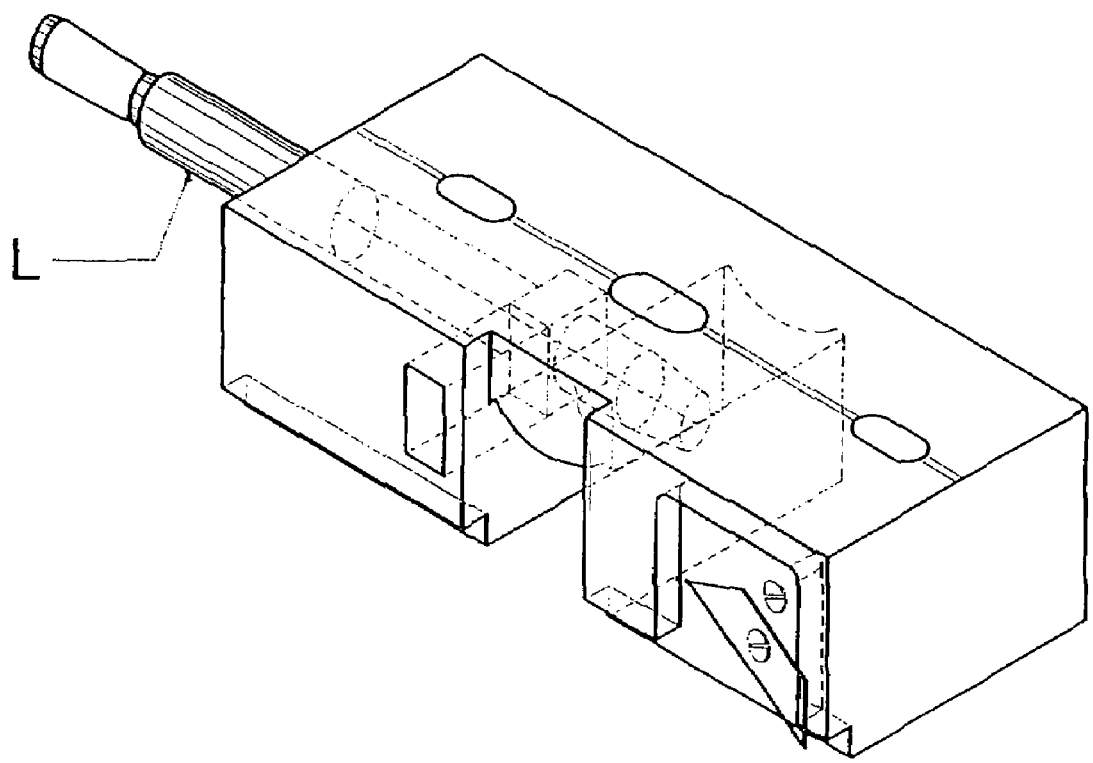
FIG. 3. shows one possible tape clamping means as a spring operated rod (L) designed to move under a tape mounted into said tape retention slot.

Extendable tape measures are in common use for many mechanical trades such as carpentry, metalwork, and sewing to give representative examples. They are used to determine or mark distances upon something that will be called a workpiece. The workpiece may be for illustrative examples: wood, fabric, metal or plastic. The workpiece will often have sharp edges as a result of sizing cuts and forming operations. Extendable tape measures commonly consist of a case from which the tape is mechanically extended and rewound, a hook or zero end on the first out of the case end, and measurement markings on one or both sides of the tape. The common metal or composite tape is usually curved in a direction perpendicular to the direction of tape extension in order to provide stiffness upon extension. The tapes are commonly but not exclusively, from about 0.5 to 1.5 inches wide and 5 to 25 feet long. The case is just physically large enough to contain the tape and its rewind mechanism. The outer edge of the slot from which the tape exits provides a sort of measuring index, but has limited ability to assist in marking or cutting needs perpendicular to the tape. Overcoming this limitation is one of the primary objectives of this device. Removing the hands and fingers from sharp edges on the workpiece is another objective of this device.

The invention in its physical form will be roughly a rectilinear box with functional holes, slots and cutouts as required to provide its functional uses. Representative but not limiting dimensions of the device will typically be about 1 inch by 1 inch by 6 inches which implies a volume of 6 cubic inches, but the device can be envisioned to have volumes from 2 to 20 cubic inches. This volume is considered as determined by the size of a box need to contain the device. In order to save material in its construction, the actual interior of the device may contain several hollow spaces. The provision of an undercut groove on one long edge of the device provides for significantly improved control of the device and safety for the operator when it is desirable to measure from or along a material edge which is rough or sharp. It is to be noted that by reversing the device's mounting upon the tape, a non-undercut side is made available for those circumstances when the edge following assistance is not advantageous. In actual practice, it is often desirable to use two of these devices on the measuring tape when working with materials having surfaces or edges which may cause injury. One device may be used to follow the material edge, and another device mounted upon the tape may be used to make the mark or cut on the workpiece.

In the lower edge of the device and perpendicular to one long narrow edge, a tape retention slot will be formed roughly centered in the long direction and with a width and shape designed to facilitate placement and retention of an inserted tape. The upper edge of the tape retention slot will be curved to match the curve of tape widths for which it is to be used. Clamping means to hold the device on the tape will be provided. Simple hand operated clamping means such as a spring loaded plunger are preferred but not limiting.

A marking instrument holder will be provided and can be designed to hold round pencils, oval pencils, or other common marking tools. The mark produced will be exactly placed and related to a measurement index. The holder can take the form of a round hole, oval hole or other shape for a specific marking tool. The holder may also take the form of a vertical slot or groove if the marker placement is located near an edge of the device.

A cutting instrument holder or location may be provided whose cutting edge is placed and related to a measurement index. The cutting instrument will be easily removable or relocated to prevent injury when not in use. The cutting instrument location may be related to the undercut groove or centrally located within the body of the device in relation to the central measurement index. Since more force is required to cut than to mark, the cutting device will usually be retained by mechanical clamping such as by a screw. Use of an included simple clamping provision such as a wing screw is anticipated.

In actual use, the device will be clamped upon the measuring tape with the cutting or marking device selected and placed appropriately on the measuring tape at the appropriate distance to achieve the mark or cut desired. In most cases, the zero end of the tape will be placed at the edge of the workpiece from which the mark or cut line is to be made. One hand will be used to slide the device along the workpiece to make the mark or cut while the other hand will slide the zero end of the tape along the edge of the workpiece. For sharp edges such as glass or metal edges, another device may be placed on the tape near the zero end and used to provide hand protection and improved contact force against said sharp edges. The measurement distance between the two devices would have to be adjusted appropriately when used in this manner.

What is claimed is:

1. An attachment designed to facilitate measured marking and cutting while using commercially available extendable tape measures having a measuring tape which may be contained within or extended from a case: said attachment comprising: a) a substantially cubic body with a width greater than either its length or height; b) said width being within a range of one to eight inches; c) a slot positioned on either an upper or lower edge of said body, said slot sized and shaped to slidably hold said body of said attachment upon said extended tape, said slot being perpendicular to said width and height sides of said attachment: d) retaining means on said body for sliding relocation and temporary fixation of said attachment upon said extended tape while said extended tape is located within said slot; e) at least one measurement index located in such a manner as to be easily viewable and easily related to measurement markings on an attached measuring tape and the position of marking and cutting provisions on said attachment; f) at least one marking instrument holder and at least one cutting instrument holder; g) said body designed to provide easy holding by one hand and protection of the hand from the work surface; and h) an undercut groove perpendicular to the direction of tape extension, said groove having a height and depth of less than 0.5 inches.

2. The attachment of claim 1 wherein provision is made only for either marking or cutting instruments.

3. The attachment of claim 1 wherein provision is made for its connection to the case of the extendable tape.

* * * * *